(12) United States Patent
Ewald et al.

(10) Patent No.: US 8,381,639 B2
(45) Date of Patent: Feb. 26, 2013

(54) DEVICE AND METHOD FOR TREATING AND RELEASING FOOD PRODUCTS

(75) Inventors: Henry T. Ewald, Roselle, IL (US); Paul G. Simmons, Glen Ellyn, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 881 days.

(21) Appl. No.: 12/082,422

(22) Filed: Apr. 11, 2008

(65) Prior Publication Data

US 2009/0255413 A1 Oct. 15, 2009

(51) Int. Cl.
- *A47J 43/00* (2006.01)
- *A23L 1/01* (2006.01)
- *A23L 1/32* (2006.01)

(52) U.S. Cl. ............... 99/442; 99/426; 99/430; 426/614

(58) Field of Classification Search .................... 99/426, 99/430, 442; 426/614
See application file for complete search history.

(56) References Cited

U.S. PATENT DOCUMENTS

| | | | | |
|---|---|---|---|---|
| 323,887 A * | 8/1885 | Rutter | ............................ | 249/119 |
| 869,690 A * | 10/1907 | Brown | ......................... | 294/26.5 |
| 982,044 A * | 1/1911 | Felger | ............................ | 249/121 |
| 1,069,509 A * | 8/1913 | Winn | ............................ | 425/292 |
| 1,350,651 A * | 8/1920 | Hirst | ............................. | 249/119 |
| 1,736,122 A * | 11/1929 | La Duke | ..................... | 126/390.1 |
| 2,008,331 A * | 7/1935 | Meisner | .......................... | 30/316 |
| 2,029,535 A * | 2/1936 | Langel | ............................ | 294/160 |
| 2,392,459 A * | 1/1946 | Casalino | ........................... | 83/620 |
| 2,481,711 A * | 9/1949 | Bemis | ............................ | 426/510 |
| 2,584,536 A * | 2/1952 | Belt | ............................... | 425/318 |
| 2,824,510 A * | 2/1958 | Gangwer | ......................... | 99/423 |
| 3,780,978 A * | 12/1973 | Proul | ............................. | 249/135 |
| 4,345,516 A * | 8/1982 | Sinclair | ........................... | 99/426 |
| 4,488,479 A * | 12/1984 | Sloan et al. | ..................... | 99/345 |
| 4,512,250 A * | 4/1985 | Schindler et al. | ............... | 99/425 |
| 4,607,569 A * | 8/1986 | Murphy | .......................... | 99/426 |
| 4,681,027 A * | 7/1987 | Meamber | ......................... | 99/422 |
| 4,862,793 A * | 9/1989 | Steiner | ........................... | 99/430 |
| 4,873,922 A * | 10/1989 | Umholtz | ......................... | 99/426 |
| 5,056,223 A * | 10/1991 | Buck et al. | ................... | 30/113.1 |
| 5,230,156 A * | 7/1993 | Patenaude | ....................... | 30/325 |
| 5,453,287 A * | 9/1995 | Close | ............................ | 426/512 |
| 5,752,432 A * | 5/1998 | Burchfield | ....................... | 99/426 |
| 6,065,393 A * | 5/2000 | Lombard et al. | ................ | 99/427 |
| 6,148,719 A * | 11/2000 | Poltielov | .......................... | 99/544 |
| 6,508,166 B1 * | 1/2003 | Hennessey | ....................... | 99/355 |
| 6,813,994 B2 * | 11/2004 | Williams | ......................... | 99/426 |
| 7,318,575 B2 * | 1/2008 | Welch et al. | ................... | 249/135 |
| D586,628 S * | 2/2009 | Bevers | ............................ | D7/672 |
| 2002/0092180 A1* | 7/2002 | Tomasulo | ........................ | 30/316 |
| 2007/0224333 A1* | 9/2007 | Ewald et al. | ................... | 426/614 |

* cited by examiner

*Primary Examiner* — Gene Kim
*Assistant Examiner* — Alexander Niconovich
(74) *Attorney, Agent, or Firm* — Ryndak & Suri LLP

(57) ABSTRACT

An apparatus and method of treating eggs and other food products and a method and apparatus for releasing an egg and other food products from a food-retaining ring are provided. The apparatus includes one or more food-retaining rings suitable to be disposed on a treating surface; and a ring shaped release tool, the exterior perimeter of the release tool being adapted to fit closely to the inside perimeter of the ring. The method of treating eggs and other food products comprises: adding a food product to a volume defined by an interior of a ring disposed on a cooking surface; treating the food product to form a self-supporting mass; and inserting a complementary-shaped release member within the ring containing the self-supporting mass, the release member being adapted to fit closely to an inside perimeter of the ring.

18 Claims, 5 Drawing Sheets

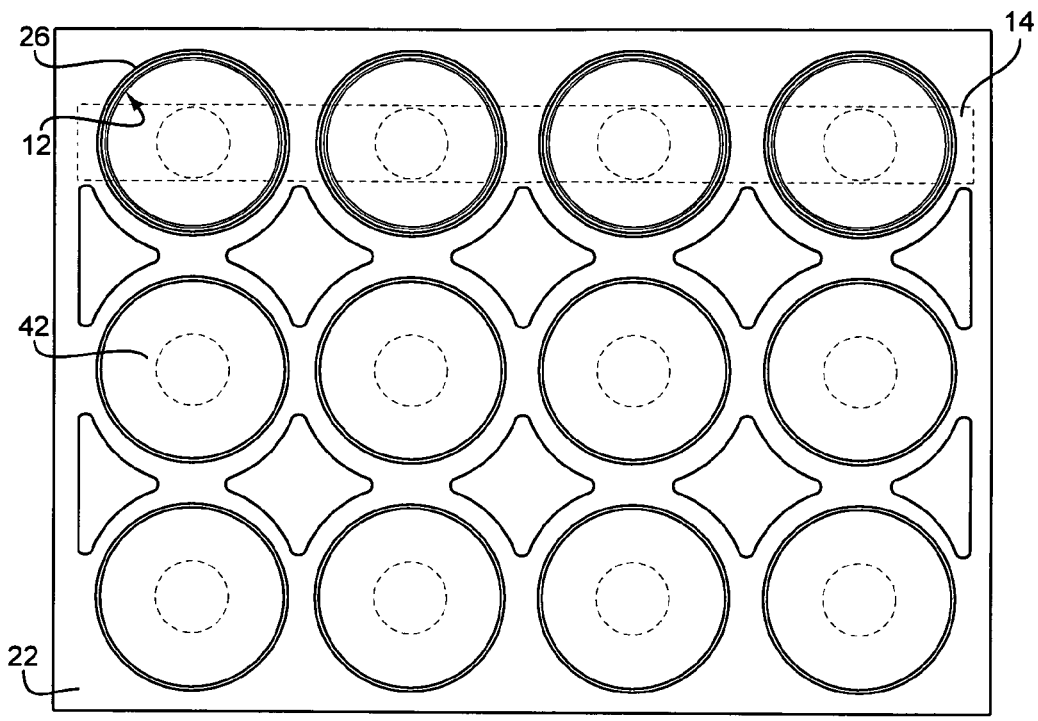
Fig.4A
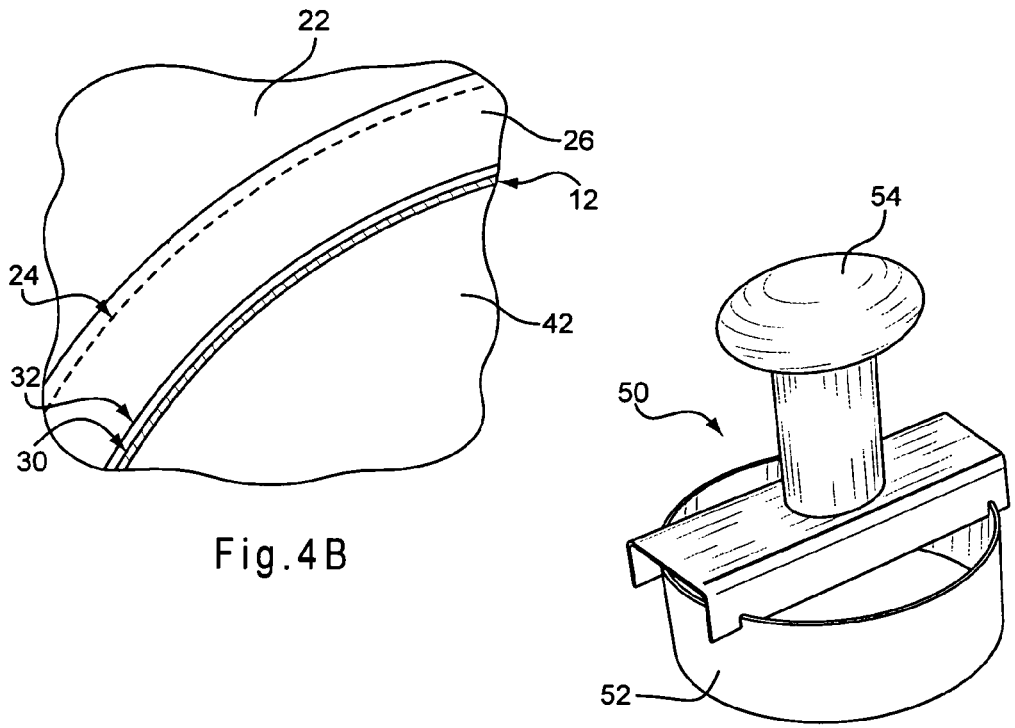
Fig.4B
Fig.5

DEVICE AND METHOD FOR TREATING AND RELEASING FOOD PRODUCTS

FIELD OF THE INVENTION

The present invention relates generally to a method and an apparatus for treating food products. More particularly, the invention relates to a device and method for cooking eggs in a food-retaining structure and releasing the food from the retaining structure for subsequent handling and use.

BACKGROUND OF THE INVENTION

Many restaurants need to prepare a high volume of food relatively quickly. Eggs and various types of egg sandwiches are common breakfast foods that are served at many such restaurants, where a large volume of such items needs to be prepared relatively quickly, particularly at breakfast. Since a high volume of food needs to be prepared quickly, labor requirements can be substantial, particularly for the high volume periods of breakfast, lunch, and dinner.

It is desirable to use fresh whole eggs, particularly for sandwiches and food items that require a whole fried or poached egg such as, for example, a fried egg sandwich or an Egg McMuffin® sandwich. In addition, it is desirable to separately cook a plurality of individual whole eggs on a single grill surface for substantially the same amount of time to help ensure consistent product quality and uniformity.

Flavor characteristics and taste sensations are important factors consumers use to evaluate food products including breakfast foods and sandwiches. It is important for consumer satisfaction that consumers receive cooked eggs that are of a consistent high quality. Therefore, there is a need for a method of cooking eggs to ensure product uniformity.

For convenience and uniformity, eggs may be cooked in egg-retaining rings placed on a grill or griddle cooking surface. The rings may be bottomless cylindrical shells, for example, so that food placed therein is in direct contact with the grill or griddle cooking surface. Preferably, several rings are arranged in an array and connected together so that multiple eggs may be cooked simultaneously. For example, twelve rings may be arranged in a 3×4 array to permit one dozen eggs to be cooked at one time. The ring array may be hinged to a frame, and a cover may be provided to facilitate fast, even cooking.

After the eggs are cooked, the eggs typically become adhered to the interior wall of the ring and a restaurant worker has to lift up the cover, separate each of the eggs adhering to the walls of a ring, and then remove the eggs from the cooking surface. Thus, it is necessary to release the egg's adherence to the ring. Prior to this invention, the cooked eggs were released from the cooking rings one at a time by the worker's inserting and moving a spatula around the inner circumference of each cooking ring between the cooked egg and the inner wall of the ring to break the bond or adherence of the egg to the ring. Using a spatula in this manner is not only relatively inefficient and time-consuming, but also risks damage to the egg during separation, such as by breaking or tearing of the egg. Thus, there is a need for a device and method that removes eggs easily, quickly, reliably and without damaging the eggs.

A need further exists for a device and method for reducing the labor intensity required at breakfast for individual shelled eggs while maintaining egg product quality and not requiring that eggs be cooked substantially in advance of serving to customers. Therefore, there is also a need for a device and method that can simultaneously release a plurality of eggs easily, quickly, reliably and without damaging them.

SUMMARY OF THE INVENTION

In accordance with the present invention, a device and method for cooking or treating food products in a retaining member and releasing the cooked or treated food products from the retaining member is provided.

In accordance with one aspect of a method in accordance with the invention, a method of cooking an egg product is provided which includes placing an egg product into a volume defined by an interior of a food-retaining ring disposed on a cooking surface; cooking the egg product in the food-retaining ring; and inserting a release member within the ring containing the cooked egg to release the cooked egg product from the ring, the release member being adapted to conform and fit closely to an inside perimeter of the ring. The ring perimeter can be of any desired shape, but typically will be circular.

In another aspect of the invention a method of releasing a food product contained within a food-retaining ring is provided, the method comprising inserting a ring-shaped release member within a ring containing a food product, the release member being adapted to fit closely to an inside perimeter of the ring.

In another aspect of the invention, an apparatus for treating one or more food products comprises at least one food-retaining ring member suitable to be disposed on a food treating surface; and at least one ring-shaped release member, the release member being adapted to fit closely to the inside perimeter of the ring member.

In accordance with still another aspect of the present invention, a method of cooking egg product is provided. The method includes placing an egg product into a volume defined by an interior wall of a ring for retaining food disposed on a cooking surface, cooking the egg product in the ring and inserting a ring-shaped release member complementary to and within the interior wall of the ring containing the cooked egg product to release the cooked egg product from the interior wall of the ring, the ring-shaped release member fitting closely to the interior wall of the ring. The method typically further includes removing the ring-shaped release member from the ring and moving the ring relative to and away from the cooked egg product. This method allows a plurality of discrete cooked egg products to be released simultaneously from a corresponding plurality of egg rings.

In accordance with another aspect of the present invention, a method of releasing a treated food product contained within a ring member defining an interior wall for retaining food is provided. The method includes inserting a complementary-shaped ring release member adjacent the interior wall of the ring member containing the food product, the release member being adapted to closely fit to the interior wall of the ring member.

In accordance with another aspect of this method, the untreated food product is a flowable non-self-supporting mass, which when treated becomes a substantially self-supporting mass. The method may further comprise placing the ring member that defines an interior wall for retaining food on a food treating surface and adding a quantity of the untreated flowable food into the ring so that the food product is retained by the interior wall of the ring member, treating the food product contained in the ring member to cause the food product to become a substantially self-supporting mass, thereafter inserting the release member to release the treated food product from the ring member and moving the ring member relative to and away from the treated food product.

In accordance with another aspect of this method, the treated food product remains on the treating surface after the ring member is moved away from the treated food product. In more specific aspects of this method, the food product may be an egg product and the food treating surface is a heated grill surface. Alternatively, the food product may be of the type that is a liquid but which solidifies when cooled and the treating comprises cooling the food product such as by contact with a cooled surface.

In accordance with still another aspect of the invention, an apparatus is provided for treating one or more food products. The apparatus comprises at least one ring member having an inside wall for retaining food and suitable to be disposed on a food treating surface, at least one complementary ring-shaped release member, the release member having an external wall or surface adapted to fit closely to the inside wall of the ring member. The apparatus may further include a plurality of ring members disposed in a predetermined array and a plurality of the ring-shaped release members mounted in an array corresponding to at least part of the array of the ring members. The apparatus may further include a plurality of ring-shaped release members arranged to be simultaneously inserted into and to engage that plurality of ring members.

In accordance with another aspect of the invention, the array of release members is a linear array.

In accordance with another aspect of the apparatus invention, the area defined by the interior wall of the ring member is slightly larger than the area defined by the external wall of the release member.

In accordance with another aspect of the invention, the ring member and the release member each are generally circular, with the inside diameter of the ring member being slightly larger than the outside diameter of the release member, which, for example, can be as desired but for typical single serving size food products can typically be about ⅛" larger or less.

BRIEF DESCRIPTION OF THE FIGURES

The accompanying drawings form part of the specification, and like numerals are employed to designate like parts throughout the same.

FIG. 4A is a bottom plan view of a ring holder with the food release tool showing their complementary relationship and use in accordance with the invention.

FIG. 4B is an enlarged partial view of the ring holder of FIG. 4A showing a release member positioned within a cooking ring.

FIG. 5 is a perspective view of another embodiment of the food release tool in accordance with the invention.

DETAILED DESCRIPTION OF THE INVENTION

The present invention provides a device and method for efficiently treating food products contained within a retaining ring and thereafter releasing the treated food products from the retaining ring for subsequent processing and/or handling, such as incorporation into a sandwich, for example. As used herein, the term "release" or "releasing" refers to breaking or lessening the bond or adherence between the food-retaining ring and the treated food item so that the food item is freely separable or removable from the retaining ring. The release tool in accordance with the invention should be sized to closely conform to the interior perimeter of the retaining ring but to allow insertion of the release tool within the ring. The cooked food release tool and method for using the tool is suitable for use with eggs, egg products and other food products which are cooked or otherwise treated in molds or retaining devices such as rings. In the attached FIGS. 3 and 4, a method of using the apparatus of the present invention to cook eggs is illustrated. However, it should be noted that the present invention applies to cooking or treating any food product which is initially in a liquid or flowable form that becomes a reasonably stable and self-supporting mass after cooking or other treatment, as will be discussed below.

Figure 1:
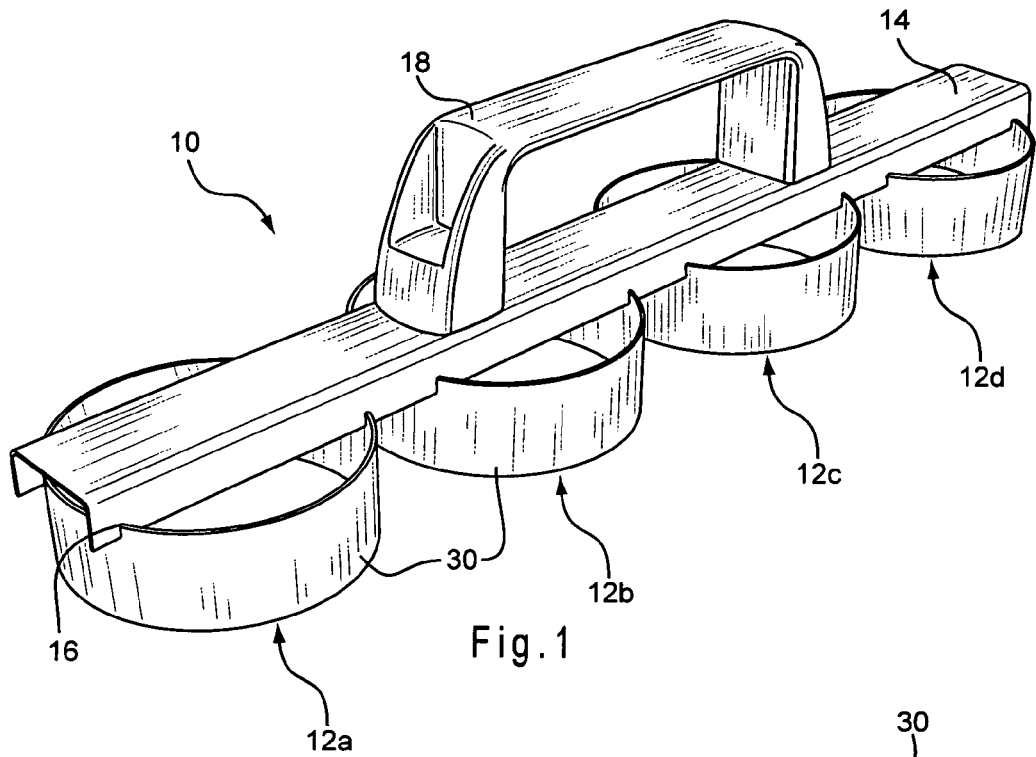
FIG. 1 is a perspective view of a food release tool in accordance with the invention.
Figure 2:
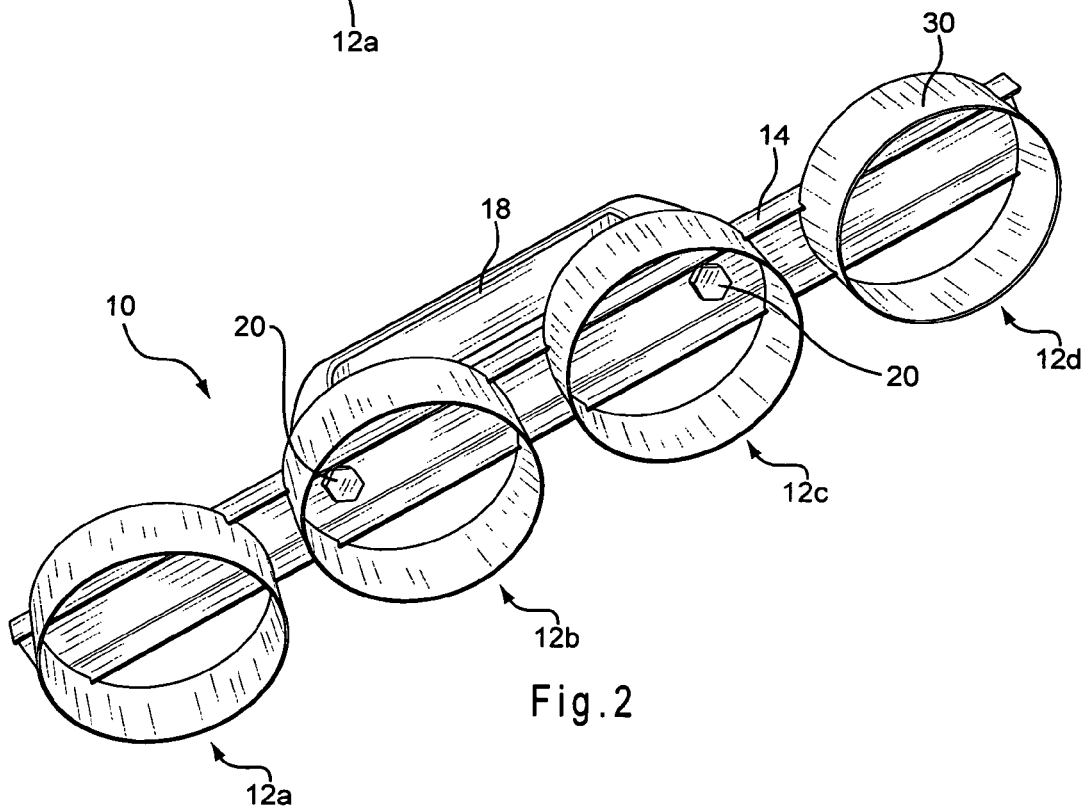
FIG. 2 is a bottom perspective view of the food release tool of FIG. 1.

As shown in FIGS. 1 and 2, a food release tool 10 in accordance with the invention is shown. Food release tool 10 includes four release members 12a-d and a frame 14. Frame 14 securely connects release members 12a-d to each other, while maintaining the desired spacing between them. Release members 12a-d and frame 14 can be of any suitable material, and are typically of the same material. Preferably, release members 12a-d and frame 14 are made of stainless steel, which is corrosion resistant, durable and easy to clean. Frame 14 is of any suitable configuration and may be, for example, in the shape of a U-shaped metal channel. Slots 16 are provided in the lower edges of the two extending sides of the channel for engaging the upper edges of release members 12a-d. Release members 12a-d are spot welded to frame 14 where they engage frame 14 at slots 16, or attached by other suitable structure, and could be removably attached by suitable fastening members if desired.

It is to be understood that any desired number of release members 12a-d can be provided in food release tool 10 in accordance with the invention. Preferably, a plurality of release members 12a-d are mounted on frame 14 as shown in FIGS. 1 and 2, since this permits multiple food items to be released simultaneously from the corresponding ring members. The individual release members 12a-d can be arranged in any pattern, including a square array, multiple rows with an offset, or a single line arrangement. Typically, individual release members 12a-d are arranged in a linear array. The release member arrangement is selected such that it is compatible with the ring array as discussed in more detail below.

Food release tool 10 typically has a handle 18, such as shown in FIG. 1 to facilitate use thereof. Handle 18 may be connected to frame 14 by two bolts 20 as shown in FIG. 2 or by other suitable structure. Handle 18 can be any size and shape to facilitate gripping and holding of release tool 10 as desired. Handle 18 is typically located at or near the middle of frame 14 for balance and ease of operation. Handle 18 may be made of plastic, wood, metal or any other suitable material.

Food release tool 10 is advantageously used in combination with food-retaining members for individual food items, such as open-bottomed food-retaining rings which may be placed on a grill or griddle for cooking eggs. A single food-retaining ring may be used, but preferably a plurality of food-retaining rings are joined together in a linear or a uniform row and column array arrangement. Thus, the rings form receptacles that can have a defined center-to-center spacing.

A preferred embodiment of the apparatus for cooking eggs and method is illustrated in FIGS. 3A-F and 4A-B. A ring holder 22 has twelve recesses 24 that hold twelve food-retaining rings 26 in a predetermined desired pattern, such as a three-by-four array. Preferably, recesses 24 hold food-retaining rings 26 loosely enough to provide sufficient space for steam generated from water metered onto the cooking surface to flow into the interior of food-retaining rings 26 and to permit a small degree of lateral movement of food-retaining rings 26. A loose fitting arrangement of food-retaining rings 26 within ring holder 22 also permits easy removal of food-retaining rings 26 for cleaning or replacement. Preferably, food-retaining rings 26 have sufficient flexibility to permit removal and reinstallation and can be made of high temperature resistant silicone rubber, for example. Ring holder 22 and also food-retaining rings 26 may be fabricated from any durable metal, such as steel, stainless steel or iron and may have a non-stick coating such as a polytetrafluoroethylene (Teflon®) coating.

The term "rings" as used herein is intended to cover any shape receptacle or cooking container, including rectangular, elliptical, circular, pentagonal, hexagonal, or any other regular geometric or irregular shape. Typically, food-retaining rings 26 are substantially circular or square in shape and typically will have an open bottom. Food-retaining rings 26 can be of any suitable material. Typically, food-retaining rings 26 are made of a flexible material that can resist high temperatures, such as silicone rubber, but may alternately be made of aluminum or stainless steel, preferably with a non-stick coating. Despite the presence of a non-stick coating on interior walls 32 of food-retaining rings 26, the cooked eggs will still exhibit adherence to the interior walls 32 of food-retaining rings 26.

Food-retaining rings 26 can be any size as desired for the particular food product, and consequently, for use with fresh eggs typically will be capable of containing one or more shelled eggs. Food-retaining rings 26 can be any size and shape and typically will have an inside dimension from about 1 to 6 inches across at the largest interior distance, (e.g., interior diameter, for a circular ring) across food-retaining rings 26. Typically, food-retaining rings 26 are circular and have an interior diameter of from about 2.25 to about 3.75 inches. More typically, food-retaining rings 26 are from about 2.5 to about 3.5 inches across and for cooking a single egg, food-retaining ring 26 may be from about 2.75 to about 3.25 inches across.

Food-retaining ring 26 may have any depth suitable for holding the desired amount of food product. Typically, food-retaining ring 26 has a depth suitable for holding one shelled egg. The depth of food-retaining rings 26 can be from about 0.5 to about 2.5 inches. Typically, the depth is from about 0.25 to about 1.5 inches. More typically, the depth is from about 0.5 to about 1.25 inches and more particularly from about 0.6 to about 0.9 inches.

Figure 3A:
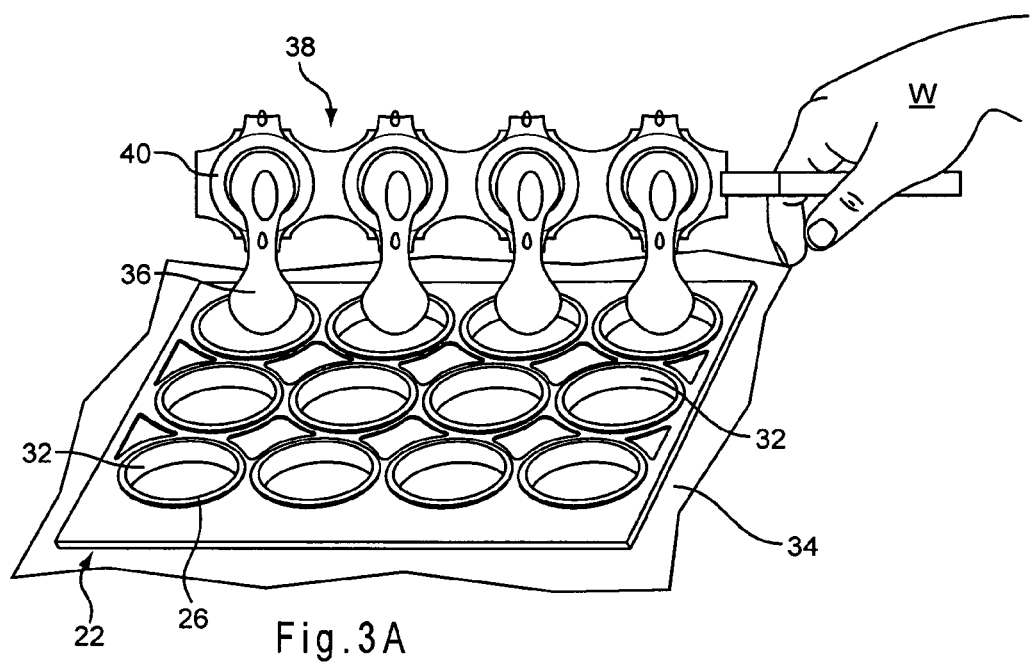
FIG. 3A is a perspective view showing the use of an uncooked food staging device to place eggs in cooking rings in accordance with the method of the invention.

Ring holder 22 may be provided with a cover (not shown) adapted to be seated on or over ring holder 22 to retain heat and moisture while cooking. Water may be metered into the covered assembly to steam the food product. Ring holder 22 is placed on a cooking surface 34, typically a conventional heated grill such as is usually found in a restaurant or institutional kitchen as shown in FIG. 3A. However, the apparatus may also be used with other heated cooking surfaces, such as a flat griddle on a heated range in a home kitchen or restaurant. As seen in FIG. 3E, ring holder 22 can be lifted off the grill by an attached handle 28.

Each release member 12a-d has an exterior wall size and shape that is complementary and similar to that of food-retaining ring 26 with which it is intended to be used. For example, if food-retaining ring 26 is square, elliptical, circular, pentagonal, hexagonal in shape, so respectively will be release member 12a-d. The closer the shape of release member 12a-d is to that of food-retaining ring 26, the less food product will be wasted and the less damage will occur to the food product provided that release members 12a-d are freely movable within food-retaining rings 26. As shown in FIG. 4A, when release members 12a-d of tool 10 are inserted into food-retaining rings 26 of ring holder 22, each release member 12a-d fits closely within a corresponding food-retaining ring 26. As shown in FIG. 4B, when release member 12a-d is placed in the center of food-retaining ring 26, typically the exterior wall 30 of release member 12a-d will be at most one-quarter of an inch away from the interior wall 32 of food-retaining ring 26. Preferably, exterior wall 30 of release member 12a-d will be within one-eighth of an inch away from interior wall 32 of food-retaining ring 26. Most preferably, exterior wall 30 of release member 12a-d will be one-sixteenth of an inch away from interior wall 32 of food-retaining ring 26. The height of release member 12a-d is preferably at least equal to, or slightly greater than, the depth of food-retaining ring 26, so that when release member 12a-d is inserted into food-retaining ring 26 it will extend to cooking surface 34 so as to release the entire food product from interior wall 32 of food-retaining ring 26.

The food product can be any type of liquid, flowable or pourable product that becomes a unitary self-supporting mass after treatment. For example, the food product can be not only any kind of egg product listed above, but also any kind of batter (e.g., waffle, pancake, crepe, etc.), any kind of dough (e.g., biscuit, muffin, etc.), custard, granules which melt when heated to form a self-supporting mass, gelatin or a gelatin-based product which gels when cooled, or various combinations thereof. The term treatment as used herein may refer to heating, cooling, or other food processing as appropriate for the particular type of food product.

The egg product may be any type of egg or egg product from any animal, including, but not limited to whole eggs, egg yolk, egg albumen or white, pasteurized whole egg products, pasteurized liquid whole egg, pasteurized liquid egg yolk, pasteurized liquid egg white, pasteurized liquid egg substitutes comprising additional ingredients, powdered whole egg comprising water, powdered egg yolk comprising water, powdered egg white comprising water, powdered egg substitutes comprising additional ingredients, other products that have egg as a substantial component and any combination of the foregoing.

In use, ring holder 22 is placed on a food treating surface. In the embodiment of this invention shown in FIGS. 3A-F, the treating surface is a cooking surface 34. Any appropriate cooking surface 34 may be utilized, including a pan, grill, or griddle surface which is heated to cook the food. If the food product is of a type that requires a form of treatment other than heating, the treating surface may be selected accordingly. For example, for a gelatin product, the treating surface may be a cooled or chilled surface.

In one embodiment of this invention, shelled eggs 36 are cracked (or an egg product is poured) directly into individual food-retaining rings 26 on cooking surface 34.

In another embodiment illustrated in FIG. 3A, an uncooked food staging device 38 is used to distribute or pour the uncooked food product into the food-retaining rings 26. Uncooked food staging device 38 provides staging for food, such as for a plurality of shelled eggs 36 in individual receptacles that can be substantially simultaneously added to a cooking apparatus for preparing consistently cooked eggs substantially simultaneously. By adding individual eggs or other food products to a cooking apparatus substantially simultaneously, it is easier to prepare eggs or food products that are simultaneously cooked for substantially the same amount of time, resulting in more consistently cooked, uniform quality cooked eggs or food products 42. Typically, one shelled egg 36 is placed into each of shelled egg receiving receptacles 40. Shelled eggs 36 are stored in uncooked food staging device 38 until their use. Typically, filled uncooked food staging devices 38 are placed in a refrigerated storage compartment until needed for cooking. The center-to-center spacing of the spouts on the individual receiving receptacles 40 of uncooked food staging device 38 is approximately the same as the center-to-center spacing of food-retaining rings 26 in ring holder 22. A suitable uncooked food staging device is shown in U.S. Published Patent Application No. 2007/0224333, the disclosure of which is hereby incorporated in its entirety by reference.

Figure 3B:
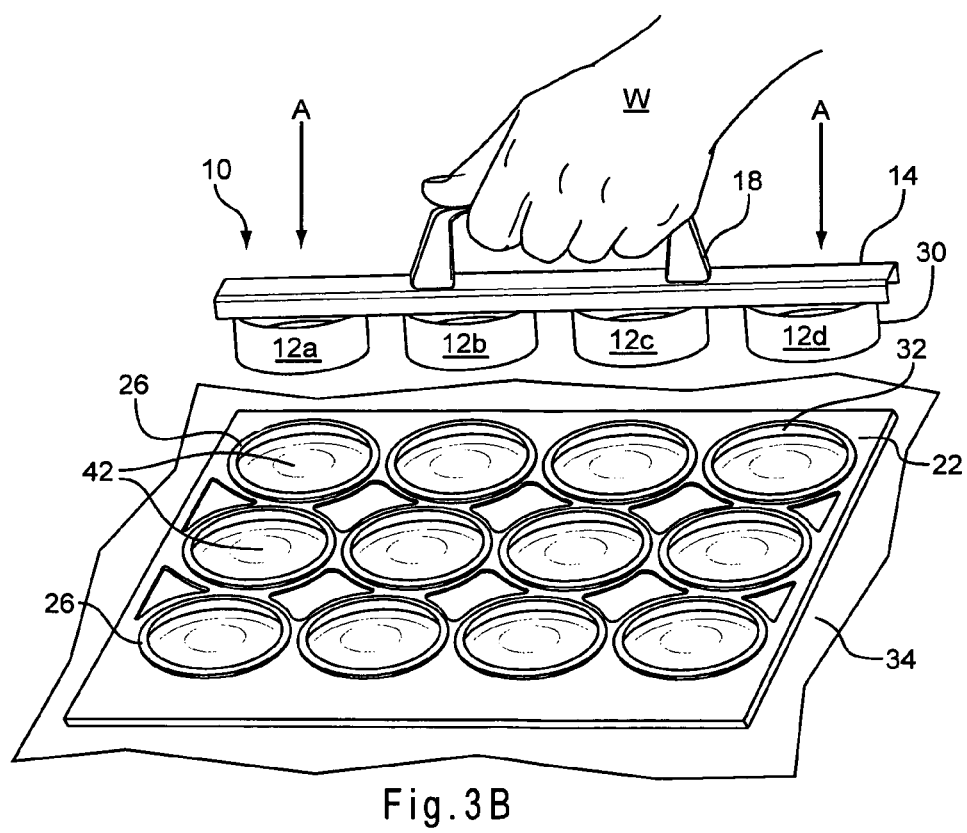
FIGS. 3B-3E are side perspective views of the food release tool showing its use in accordance with various aspects of the method of invention.
Figure 3C:
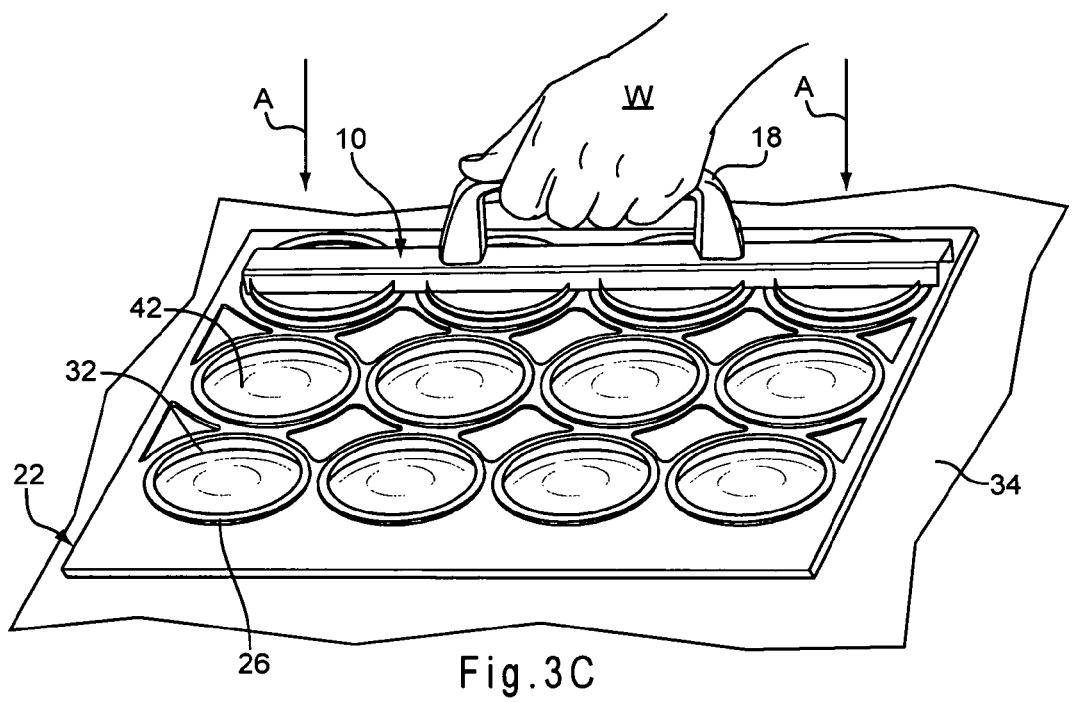
Figure 3D:
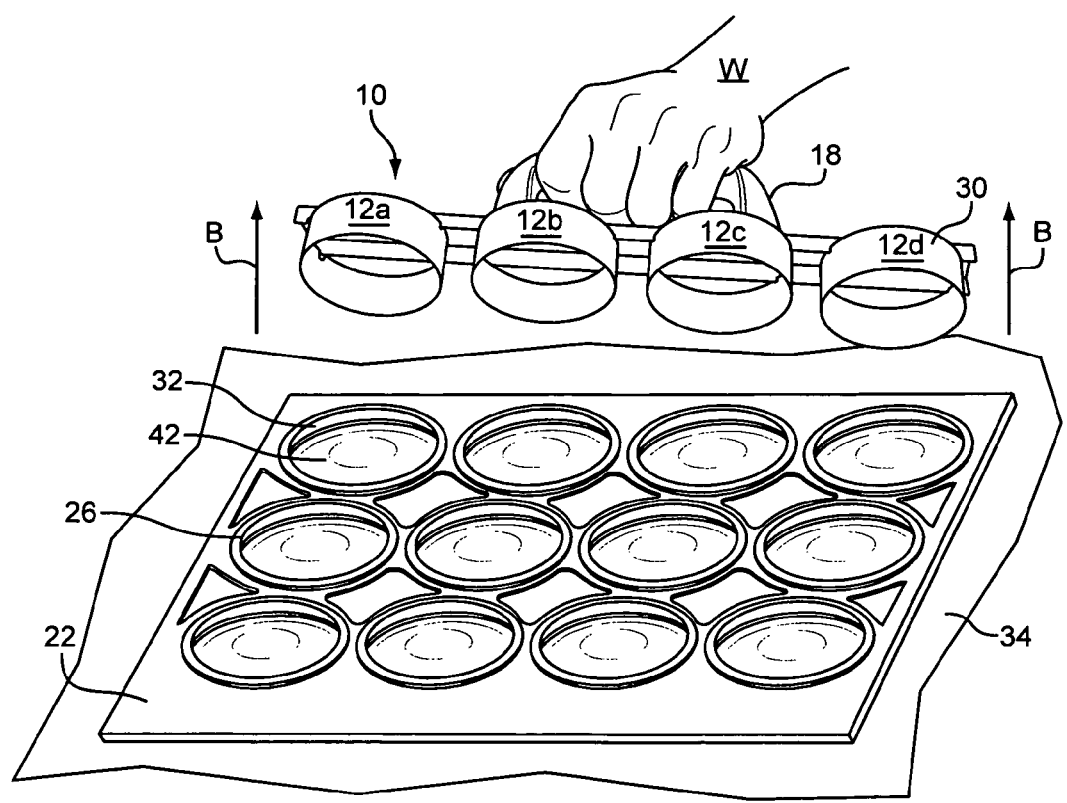
Figure 3E:
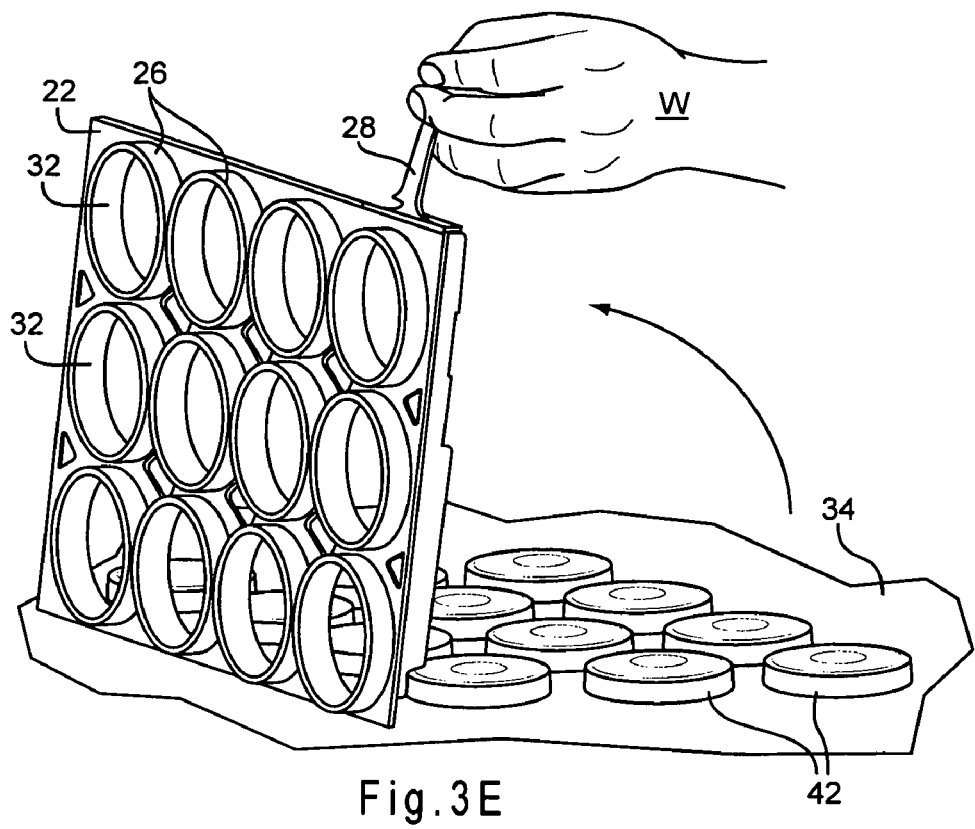
Figure 3F:
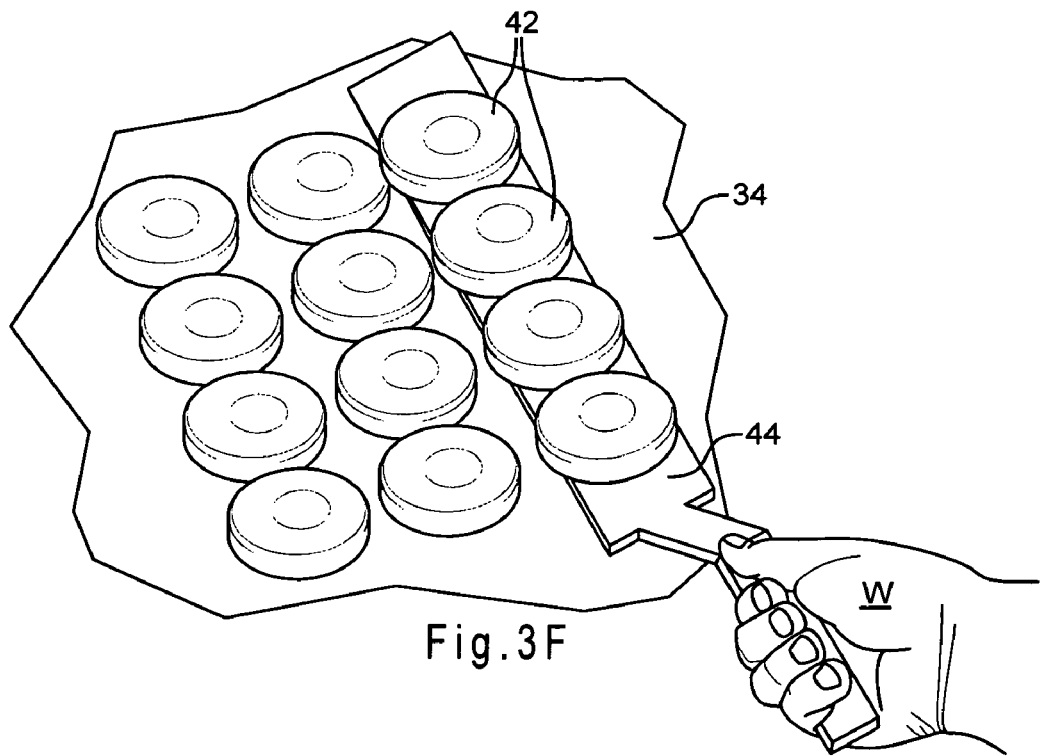
FIG. 3F is a perspective view showing use of a spatula to remove the released cooked eggs from the cooking surface in accordance with the method of the invention.

The method of the invention and use of food release tool 10 and food-retaining rings 26 of the invention are illustrated in FIGS. 3A-F. First, ring holder 22 with twelve food-retaining rings 26 is placed on heated cooking surface 34. Each food-retaining ring 26 is then filled by a worker W with one shelled egg 36, either one by one or several at once using uncooked food staging device 38 as shown in FIG. 3A. After food-retaining rings 26 are filled by one of the previously described methods, shelled eggs 36 are maintained on cooking surface 34 until the eggs are sufficiently cooked, typically to form a self-supporting mass. Cooked eggs 42 are then released from the food-retaining rings 26 with release tool 10 by worker W first moving tool 10 vertically downwardly in the direction of arrow A as shown in FIG. 3B, and inserting release members 12a-d vertically downwardly into one row of food-retaining rings 26 as shown in FIG. 3C, and then removing release members 12a-d from food-retaining rings 26 by moving tool 10 vertically upwardly in the direction indicated by arrow B and out of engagement with food-retaining rings 26 as shown in FIG. 3D. This procedure is then repeated twice more for the two other rows of food-retaining rings 26. After cooked eggs 42 are released from food-retaining rings 26, food-retaining rings 26 are removed or moved relative to and away from cooked eggs 42 such as by worker W lifting or pivoting ring holder 22 as shown in FIG. 3E, allowing cooked eggs 42 to easily and freely separate from food-retaining rings 26 and remain on cooking surface 34. Cooked eggs 42 are then removed by worker W from cooking surface 34 in a manner as desired which can be in groups of four at once with an elongated spatula 44 as shown in FIG. 3F. Spatula 44 allows a user to pick up a plurality of the cooked eggs 42 substantially simultaneously.

Use of the food release tool and method of the present invention was found to save from about 15 to 45 seconds per dozen eggs cooked simultaneously in a 3×4 egg ring array using food release tool 10 to release the eggs from their adherence to the interior walls of the egg rings as compared to the prior art method of loosening each egg individually with a spatula. Use of the present invention was also found to substantially eliminate egg damage and waste that resulted from releasing the eggs from the egg rings manually with a spatula.

An alternate embodiment of a single-release member food removal tool 50 with one release member 52 and handle 54 is shown in FIG. 5.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A method of cooking an egg product, comprising:
    placing an egg product into a volume defined by an interior wall of a ring for retaining food disposed on a cooking surface, wherein the ring for retaining food comprises a recess allowing lateral movement of the ring;
    cooking the egg product in the ring; and
    after cooking the egg product, releasing the egg product from the ring while the ring and egg product are on the cooking surface by inserting a ring-shaped release member complementary to and within the interior wall of the ring containing the cooked egg product to release the cooked egg product from the interior wall of the ring by movement of the ring-shaped release member along the interior wall of the ring containing the cooked eqg while the ring for retaining food remains on the cooking surface, the ring-shaped release member fitting closely to the interior wall of the ring, wherein the ring-shaped release member is separate from the ring for retaining food.

2. The method of claim 1 further comprising:
    removing the release member from the ring; and
    moving the ring relative to and away from the cooked egg product.

3. The method of claim 1 wherein a plurality of discrete cooked egg products are released simultaneously from a corresponding plurality of egg rings.

4. The method of claim 1 wherein the egg product is selected from the group consisting of whole eggs, egg yolk, egg albumen or white, pasteurized whole egg products, pasteurized liquid whole egg, pasteurized liquid egg yolk, pasteurized liquid egg white, pasteurized liquid egg substitutes comprising additional ingredients, powdered whole egg comprising water, powdered egg yolk comprising water, powdered egg white comprising water, powdered egg substitutes comprising additional ingredients, other products that have egg as a substantial component and combinations thereof.

5. The method of claim 1 wherein the recess allows steam to flow into the interior of the ring for retaining food.

6. A method of releasing a treated food product contained within a ring member defining an interior wall for retaining the food product while the food product and ring are on a food treating surface, comprising:
    releasing the food product from the ring by inserting a detached complementary-shaped ring release member adjacent the interior wall of the ring member containing the food product while the food product and the ring are on the food treating surface, the release member being adapted to fit closely to the interior wall of the ring member.

7. The method of claim 6 wherein the untreated food product is a flowable food product which when treated becomes a substantially self-supporting mass, further comprising:
    placing the ring on a food treating surface;
    adding a quantity of the untreated flowable food product into the ring;
    treating the food product contained in the ring member to cause the food product to become a substantially self-supporting mass;
    inserting the release member to release the treated food product from the ring member; and
    moving the ring member relative to and away from the treated food product.

8. The method of claim 7 wherein substantially the entire treated food product remains on the treating surface after said moving the ring member away from the treated food product.

9. The method of claim 7 wherein the food product is an egg product.

10. The method of claim 7 wherein the food treating surface is a heated grill.

11. The method of claim 7 wherein the food treating surface is a cooled surface.

12. An apparatus for treating one or more food products, comprising:
   at least one ring member having an inside wall suitable for retaining food and to be disposed on a food treating surface, wherein the ring member comprises a recess allowing lateral movement of the ring; and
   at least one detached complementary ring-shaped release member, the release member having an exterior wall adapted to fit closely to the inside wall of the ring member, wherein the ring-shaped release member is separate from the ring member and the release member being insertable into the ring member to release food therein while the ring member and food product are disposed on the food treating surface.

13. The apparatus of claim 12 further comprising:
   a plurality of said ring members disposed in a predetermined array;
   a plurality of said ring-shaped release members mounted in an array corresponding to at least part of the array of the ring members.

14. The apparatus of claim 13 wherein the plurality of ring-shaped release members are arranged to be simultaneously inserted into and engage that plurality of said ring members.

15. The apparatus of claim 13 wherein the array of release members is a linear array.

16. The apparatus of claim 12 wherein the area defined by the interior wall of the ring member is slightly larger than the area defined by the external wall of the release member.

17. The apparatus of claim 12 wherein the ring member and the release member each are generally circular, and the inside diameter of the ring member is slightly larger than the outside diameter of the release member.

18. The apparatus of claim 17 wherein the inside diameter of the ring member is less than or equal to ⅛" larger than the outside diameter of the release member.

* * * * *